(12) United States Patent
Stanczak et al.

(10) Patent No.: US 12,133,065 B2
(45) Date of Patent: Oct. 29, 2024

(54) APPARATUS, METHOD AND COMPUTER PROGRAM FOR HANDOVER

(71) Applicant: Nokia Technologies Oy, Espoo (FI)

(72) Inventors: Jedrzej Stanczak, Wroclaw (PL); Tero Henttonen, Espoo (FI); Ahmad Awada, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 432 days.

(21) Appl. No.: 17/621,771

(22) PCT Filed: Jul. 30, 2019

(86) PCT No.: PCT/FI2019/050571
§ 371 (c)(1),
(2) Date: Dec. 22, 2021

(87) PCT Pub. No.: WO2021/019125
PCT Pub. Date: Feb. 4, 2021

(65) Prior Publication Data
US 2022/0361062 A1    Nov. 10, 2022

(51) Int. Cl.
*H04W 36/00* (2009.01)
(52) U.S. Cl.
CPC . *H04W 36/0058* (2018.08); *H04W 36/00725* (2023.05); *H04W 36/0077* (2013.01)
(58) Field of Classification Search
CPC ......... H04W 36/0072; H04W 36/0058; H04W 36/0077; H04W 36/00725
See application file for complete search history.

(56) References Cited

U.S. PATENT DOCUMENTS

2002/0119779 A1* 8/2002 Ishikawa ............... H04W 36/30
                                                              455/437
2007/0015513 A1* 1/2007 Thorson .............. H04W 36/185
                                                              455/442
(Continued)

FOREIGN PATENT DOCUMENTS

EP         3716682 A1      9/2020

OTHER PUBLICATIONS

"3rd Generation Partnership Project; Technical Specification Group Radio Access Network; NR; Radio Resource Control (RRC) protocol specification (Release 15)", 3GPP TS 38.331, V15.5.1, Apr. 2019, pp. 1-491.
(Continued)

*Primary Examiner* — The Hy Nguyen
*Assistant Examiner* — Jesse P. Samluk
(74) *Attorney, Agent, or Firm* — Robert P. Michal, Esq.; Carter, DeLuca & Farrell LLP

(57) ABSTRACT

There is provided an apparatus, said apparatus comprising means for receiving a handover command from a first cell, the handover command comprising an uplink resource grant and a condition to be met before handover is performed to a second cell, wherein the uplink resource grant indicates a set of uplink resources for uplink data transmission in the second cell without random access, determining validity of the uplink resource grant based on one or more further configuration parameter and in response to the condition being met, performing the handover according to the validity of the uplink resource grant.

1 Claim, 8 Drawing Sheets

(56) References Cited

U.S. PATENT DOCUMENTS

| | | | |
|---|---|---|---|
| 2011/0176511 A1* | 7/2011 | Sayeedi | H04W 36/0016 370/331 |
| 2018/0338271 A1* | 11/2018 | Park | H04B 7/0695 |
| 2022/0022229 A1* | 1/2022 | Wong | H04W 72/20 |
| 2022/0272589 A1* | 8/2022 | Ishii | H04W 36/00837 |

OTHER PUBLICATIONS

"3rd Generation Partnership Project; Technical Specification Group Radio Access Network; NR; Medium Access Control (MAC) protocol specification (Release 15)", 3GPP TS 38.321, V15.5.0, Mar. 2019, pp. 1-78.

"3rd Generation Partnership Project; Technical Specification Group Radio Access Network; NG-RAN; Xn application protocol (XnAP) (Release 15)", 3GPP TS 38.423, V15.3.0, Mar. 2019, pp. 1-294.

"New Work Item on even further Mobility enhancement in E-Utran", 3GPP TSG RAN Meeting #80, RP-181337, Agenda: 10.1.1, China Telecom, Jun. 11-14, 2018, 4 pages.

"New WID: NR mobility enhancements", 3GPP TSG RAN Meeting #80, RP-181433, Agenda: 9.1.10, Intel Corporation, May 21-25, 2018, 5 pages.

"3rd Generation Partnership Project; Technical Specification Group Radio Access Network; NR; NR and NG-RAN Overall Description; Stage 2 (Release 15)", 3GPP TS 38.300, V15.5.0, Mar. 2019, pp. 1-97.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300, V15.5.0, Mar. 2019, pp. 1-363.

"LS on NR mobility enhancement", 3GPP TSG-RAN WG4 Meeting #91, R4-1907730, TSG RAN WG4, May 13-17, 2019, 1 page.

International Search Report and Written Opinion received for corresponding Patent Cooperation Treaty Application No. PCT/FI2019/050571, dated Jun. 26, 2020, 22 pages.

"Basic details of Conditional Handover in E-UTRAN", 3GPP TSG-RAN WG2 Meeting #105, R2-1902254, Agenda: 12.3.3, Nokia, Feb. 25-Mar. 1, 2019, 4 pages.

"RACH-less HO in beam-based system", 3GPP TSG-RAN WG2 Meeting #106, R2-1907267, Agenda: 11.9.2.4, Nokia, May 13-17, 2019, 5 pages.

* cited by examiner

APPARATUS, METHOD AND COMPUTER PROGRAM FOR HANDOVER

RELATED APPLICATION

This application was originally filed as PCT Application No. PCT/FI2019/050571 on Jul. 30, 2019, each of which is incorporated herein by reference in its entirety.

FIELD

The present application relates to a method, apparatus, system and computer program and in particular but not exclusively to RACH (Random Access Channel)-less conditional handover in beam-based systems.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus, said apparatus comprising means for receiving a handover command from a first cell, the handover command comprising an uplink resource grant and a condition to be met before handover is performed to a second cell, wherein the uplink resource grant indicates a set of uplink resources for uplink data transmission in the second cell without random access, determining validity of the uplink resource grant based on one or more further configuration parameter and in response to the condition being met, performing the handover according to the validity of the uplink resource grant.

The one or more further configuration parameter may comprise a timer and an indication of a time resource number.

Means for determining validity of the uplink resource grant may comprises means for determining that the uplink resource grant is invalid, in response to at least one of expiry of the timer and the indicated time resource number being reached.

Means for performing the handover according to the validity of the uplink resource grant may comprise means for performing a random access based handover to the second cell when the condition is met, in response to determining that uplink resource grant is invalid.

The one or more further configuration parameter may comprise a threshold for at least one of signal strength and signal quality of a reference signal associated with the set of uplink resources and means for determining validity of the uplink resource grant may comprise means for determining that the at least one of signal strength and signal quality of a reference signal associated with at least a subset of the set of uplink resources is below the threshold; and, in response, providing an indication to the first cell that the at least one of signal strength and signal quality of the reference signal is below the threshold.

The apparatus may comprise means for receiving an updated uplink resource grant from the first cell in response to the indication.

Means for performing the handover according to the validity of the uplink resource grant may comprise means for performing the handover to the second cell based on the updated uplink resource grant when the condition is met.

The apparatus may comprise means for discarding at least a subset of the set of uplink resources, in response to at least one of expiry of the timer and the indicated time resource number being reached.

Means for performing the handover according to the validity of the uplink resource grant may comprise means for performing the handover by using a subset of the set of uplink resources other than the discarded subset for uplink data transmission in the second cell.

The apparatus may comprise means for providing an indication to the first cell that the subset of the set of uplink resources has been discarded.

The apparatus may comprise means for receiving an indication from the first cell of the at least a subset of the set of uplink resources to discard.

The or more further configuration parameter may comprise a threshold for at least one of signal strength and signal quality of a reference signal associated with the set of uplink resources. The apparatus may comprise means for determining at the user equipment which subset of the set of uplink resources to discard based on whether the reference signal associated with the uplink resource is below a threshold.

The apparatus may comprise means for receiving the one or more further configuration parameter in the handover command or an additional message from the first cell.

The apparatus may comprise means for detecting signal strength or signal quality for a reference signal associated with an uplink resource other than those indicated in the uplink resource grant and providing a measurement report to the first cell, in response to the detected signal strength or signal quality exceeding a reference level.

The reference level may be defined based on a signal strength or signal quality for a reference signal that is associated with the uplink resource grant.

In a second aspect there is provided a first network device serving a first cell, said first network device comprising means for receiving an indication from a communication device in the first cell, the indication indicating that at least one of signal strength and signal quality of a reference signal associated with at least a subset of a set of uplink resources allocated for conditional handover to a second cell without random access is below a threshold, or at least a subset of the set of uplink resources is discarded and providing the indication to a second network device serving the second cell.

The first network device may comprise means for receiving an updated uplink resource grant from the second network device and providing the updated uplink resource grant to the communication device.

In a third aspect there is provided a second network device serving a second cell, said second network device comprising means for receiving an indication from a first network device serving a first cell, the indication indicating that at least one of signal strength and signal quality associated with a reference signal of at least a subset of a set of uplink resources allocated to a communication device for conditional handover to the second cell without random access is below a threshold, or at least a subset of the set of uplink resources is discarded by the communication device and performing at least one of: providing an updated uplink resource grant for the handover to the first network device and releasing the subset of the set of uplink resources allocated to the communication device.

In a fourth aspect there is provided a method comprising receiving a handover command from a first cell, the handover command comprising an uplink resource grant and a condition to be met before handover is performed to a second cell, wherein the uplink resource grant indicates a set of uplink resources for uplink data transmission in the second cell without random access, determining validity of the uplink resource grant based on one or more further configuration parameter and in response to the condition being met, performing the handover according to the validity of the uplink resource grant.

The one or more further configuration parameter may comprise at least one of a timer and an indication of a time resource number.

Determining validity of the uplink resource grant may comprises determining that the uplink resource grant is invalid, in response to at least one of expiry of the timer and the indicated time resource number being reached.

Performing the handover according to the validity of the uplink resource grant may comprise performing a random access based handover to the second cell when the condition is met, in response to determining that uplink resource grant is invalid.

The one or more further configuration parameter may comprise a threshold for at least one of signal strength and signal quality of a reference signal associated with the set of uplink resources. Determining validity of the uplink resource grant may comprise determining that the at least one of signal strength and signal quality of a reference signal associated with at least a subset of the set of uplink resources is below the threshold; and, in response, providing an indication to the first cell that the at least one of signal strength and signal quality of the reference signal is below the threshold.

The method may comprise receiving an updated uplink resource grant from the first cell in response to the indication.

Performing the handover according to the validity of the uplink resource grant may comprise performing the handover to the second cell based on the updated uplink resource grant when the condition is met.

The method may comprise discarding at least a subset of the set of uplink resources, in response to at least one of, expiry of the timer and the indicated time resource number being reached.

Performing the handover according to the validity of the uplink resource grant may comprise performing the handover by using a subset of the set of uplink resources other than the discarded subset for uplink data transmission in the second cell.

The method may comprise providing an indication to the first cell that the subset of the set of uplink resources has been discarded.

The method may comprise receiving an indication from the first cell of the at least a subset of the set of uplink resources to discard.

The one or more further configuration parameter comprises a threshold for at least one of signal strength and signal quality of a reference signal associated with the set of uplink resources. The method may comprise determining at the user equipment which subset of the set of uplink resources to discard based on whether the reference signal associated with the uplink resource is below a threshold.

The method may comprise receiving the one or more further configuration parameter in the handover command or an additional message from the first cell.

The method may comprise detecting signal strength or signal quality for a reference signal associated with an uplink resource other than those indicated in the uplink resource grant and providing a measurement report to the first cell, in response to the detected signal strength or signal quality exceeding a reference level.

The reference level may be defined based on a signal strength or signal quality for a reference signal that is associated with the uplink resource grant.

In a fifth aspect there is provided a method at a first network device serving a first cell. The method comprises receiving an indication from a communication device in the first cell, the indication indicating that at least one of signal strength and signal quality of a reference signal associated with at least a subset of a set of uplink resources allocated for conditional handover to a second cell without random access is below a threshold, or at least a subset of the set of uplink resources is discarded and providing the indication to a second network device serving the second cell.

The method may comprise receiving an updated uplink resource grant from the second network device and providing the updated uplink resource grant to the communication device.

In a sixth aspect there is provided a method at a second network device serving a second cell. The method comprises receiving an indication from a first network device serving a first cell, the indication indicating that at least one of signal strength and signal quality associated with a reference signal of at least a subset of a set of uplink resources allocated to a communication device for conditional handover to the second cell without random access is below a threshold, or at least a subset of the set of uplink resources is discarded by the communication device and performing at least one of: providing an updated uplink resource grant for the handover to the first network device and releasing the subset of the set of uplink resources allocated to the communication device.

In a seventh aspect there is provided an apparatus comprising: at least one processor and at least one memory including a computer program code, the at least one memory and computer program code configured to, with the at least one processor, cause the apparatus at least to: receive a handover command from a first cell, the handover command comprising an uplink resource grant and a condition to be met before handover is performed to a second cell, wherein the uplink resource grant indicates a set of uplink resources for uplink data transmission in the second cell without random access, determine validity of the uplink resource grant based on one or more further configuration parameter and in response to the condition being met, perform the handover according to the validity of the uplink resource grant.

The one or more further configuration parameter may comprise at least one of, a timer and an indication of a time resource number.

The apparatus may be configured to determine that the uplink resource grant is invalid, in response to at least one of expiry of the timer and the indicated time resource number being reached.

The apparatus may be configured to perform a random access based handover to the second cell when the condition is met, in response to determining that uplink resource grant is invalid.

The one or more further configuration parameter may comprise a threshold for at least one of signal strength and signal quality of a reference signal associated with the set of uplink resources. The apparatus may be configured to determine that the at least one of signal strength and signal quality of a reference signal associated with at least a subset of the set of uplink resources is below the threshold; and, in response, provide an indication to the first cell that the at least one of signal strength and signal quality of the reference signal is below the threshold.

The apparatus may be configured to receive an updated uplink resource grant from the first cell in response to the indication.

The apparatus may be configured to perform the handover to the second cell based on the updated uplink resource grant when the condition is met.

The apparatus may be configured to discard at least a subset of the set of uplink resources, in response to at least one of expiry of the timer and the indicated time resource number being reached.

The apparatus may be configured to perform the handover by using a subset of the set of uplink resources other than the discarded subset for uplink data transmission in the second cell.

The apparatus may be configured to provide an indication to the first cell that the subset of the set of uplink resources has been discarded.

The apparatus may be configured to receive an indication from the first cell of the at least a subset of the set of uplink resources to discard.

The one or more further configuration parameter may comprise a threshold for at least one of signal strength and signal quality of a reference signal associated with the set of uplink resources The apparatus may be configured to determine at the user equipment which subset of the set of uplink resources to discard based on whether the reference signal associated with the uplink resource is below a threshold.

The apparatus may be configured to receive the one or more further configuration parameter in the handover command or an additional message from the first cell.

The apparatus may be configured to detect signal strength or signal quality for a reference signal that is associated with an uplink resource other than those indicated in the uplink resource grant and provide a measurement report to the first cell, in response to the detected signal strength or signal quality exceeding a reference level.

The reference level may be defined based on a signal strength or signal quality for a reference signal that is associated with the uplink resource grant.

In an eighth aspect there is provided a first network device serving a first cell comprising: at least one processor and at least one memory including a computer program code, the at least one memory and computer program code configured to, with the at least one processor, cause the first network device at least to receive an indication from a communication device in the first cell, the indication indicating that at least one of signal strength and signal quality of a reference signal associated with at least a subset of a set of uplink resources allocated for conditional handover to a second cell without random access is below a threshold, or at least a subset of the set of uplink resources is discarded and provide the indication to a second network device serving the second cell.

The apparatus may be configured to receive an updated uplink resource grant from the second network device and provide the updated uplink resource grant to the communication device.

In a ninth aspect there is provided a second network device serving a second cell comprising: at least one processor and at least one memory including a computer program code, the at least one memory and computer program code configured to, with the at least one processor, cause the second network device at least to receive an indication from a first network device serving a first cell, the indication indicating that at least one of signal strength and signal quality associated with a reference signal of at least a subset of a set of uplink resources allocated to a communication device for conditional handover to the second cell without random access is below a threshold, or at least a subset of the set of uplink resources is discarded by the communication device; and perform at least one of: providing an updated uplink resource grant for the handover to the first network device and releasing the subset of the set of uplink resources allocated to the communication device.

In a tenth aspect there is provided a computer readable medium comprising program instructions for causing an apparatus to perform at least the following: receiving a handover command from a first cell, the handover command comprising an uplink resource grant and a condition to be met before handover is performed to a second cell, wherein the uplink resource grant indicates a set of uplink resources for uplink data transmission in the second cell without random access, determining validity of the uplink resource grant based on one or more further configuration parameter and in response to the condition being met, performing the handover according to the validity of the uplink resource grant.

The one or more further configuration parameter may comprise at least one of, a timer and an indication of a time resource number.

The apparatus may be caused to perform determining that the uplink resource grant is invalid, in response to at least one of expiry of the timer and the indicated time resource number being reached.

Performing the handover according to the validity of the uplink resource grant may comprise performing a random access based handover to the second cell when the condition is met, in response to determining that uplink resource grant is invalid.

The one or more further configuration parameter may comprise a threshold for at least one of signal strength and signal quality of a reference signal associated with the set of uplink resources. Determining validity of the uplink resource grant may comprise determining that the at least one of signal strength and signal quality of a reference signal associated with a subset or all of the set of uplink resources is below the threshold; and, in response, providing an indication to the first cell that the at least one of signal strength and signal quality of the reference signal is below the threshold.

The apparatus may be caused to perform receiving an updated uplink resource grant from the first cell in response to the indication.

Performing the handover according to the validity of the uplink resource grant may comprise performing the handover to the second cell based on the updated uplink resource grant when the condition is met.

The apparatus may be caused to perform discarding at least a subset of the set of uplink resources, in response to at least one of expiry of the timer and the indicated time resource number being reached.

Performing the handover according to the validity of the uplink resource grant may comprise performing the handover by using a subset of the set of uplink resources other than the discarded subset for uplink data transmission in the second cell.

The apparatus may be caused to perform providing an indication to the first cell that the subset of the set of uplink resources has been discarded.

The apparatus may be caused to perform receiving an indication from the first cell of the at least a subset of the set of uplink resources to discard.

The one or more further configuration parameter may comprise a threshold for at least one of signal strength and signal quality of a reference signal associated with the set of uplink resources The apparatus may be caused to perform determining at the user equipment which subset of the set of uplink resources to discard based on whether the reference signal associated with the uplink resource is below a threshold.

The apparatus may be caused to perform receiving the one or more further configuration parameter in the handover command or an additional message from the first cell.

The apparatus may be caused to perform detecting signal strength or signal quality for a reference signal associated with an uplink resource other than those indicated in the uplink resource grant and providing a measurement report to the first cell, in response to the detected signal strength or signal quality exceeding a reference level.

The reference level may be defined based on a signal strength or signal quality for a reference signal that is associated with the uplink resource grant.

In an eleventh aspect there is provided a computer readable medium comprising program instructions for causing a first network device serving a first cell to perform at least the following: receiving an indication from a communication device in the first cell, the indication indicating that at least one of signal strength and signal quality of a reference signal associated with at least a subset of a set of uplink resources allocated for conditional handover to a second cell without random access is below a threshold, or at least a subset of the set of uplink resources is discarded and providing the indication to a second network device serving the second cell.

The apparatus may be caused to perform receiving an updated uplink resource grant from the second network device and providing the updated uplink resource grant to the communication device.

In a twelfth aspect there is provided a computer readable medium comprising program instructions for causing an second network device serving a second cell to perform at least the following: receiving an indication from a first network device serving a first cell, the indication indicating that at least one of signal strength and signal quality associated with a reference signal of at least a subset of a set of uplink resources allocated to a communication device for conditional handover to the second cell without random access is below a threshold, or at least a subset of the set of uplink resources is discarded by the communication device and performing at least one of providing an updated uplink resource grant for the handover to the first network device and releasing the subset of the set of uplink resources allocated to the communication device.

In a thirteenth aspect there is provided a non-transitory computer readable medium comprising program instructions for causing an apparatus to perform at least the method according to the fourth, fifth or sixth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
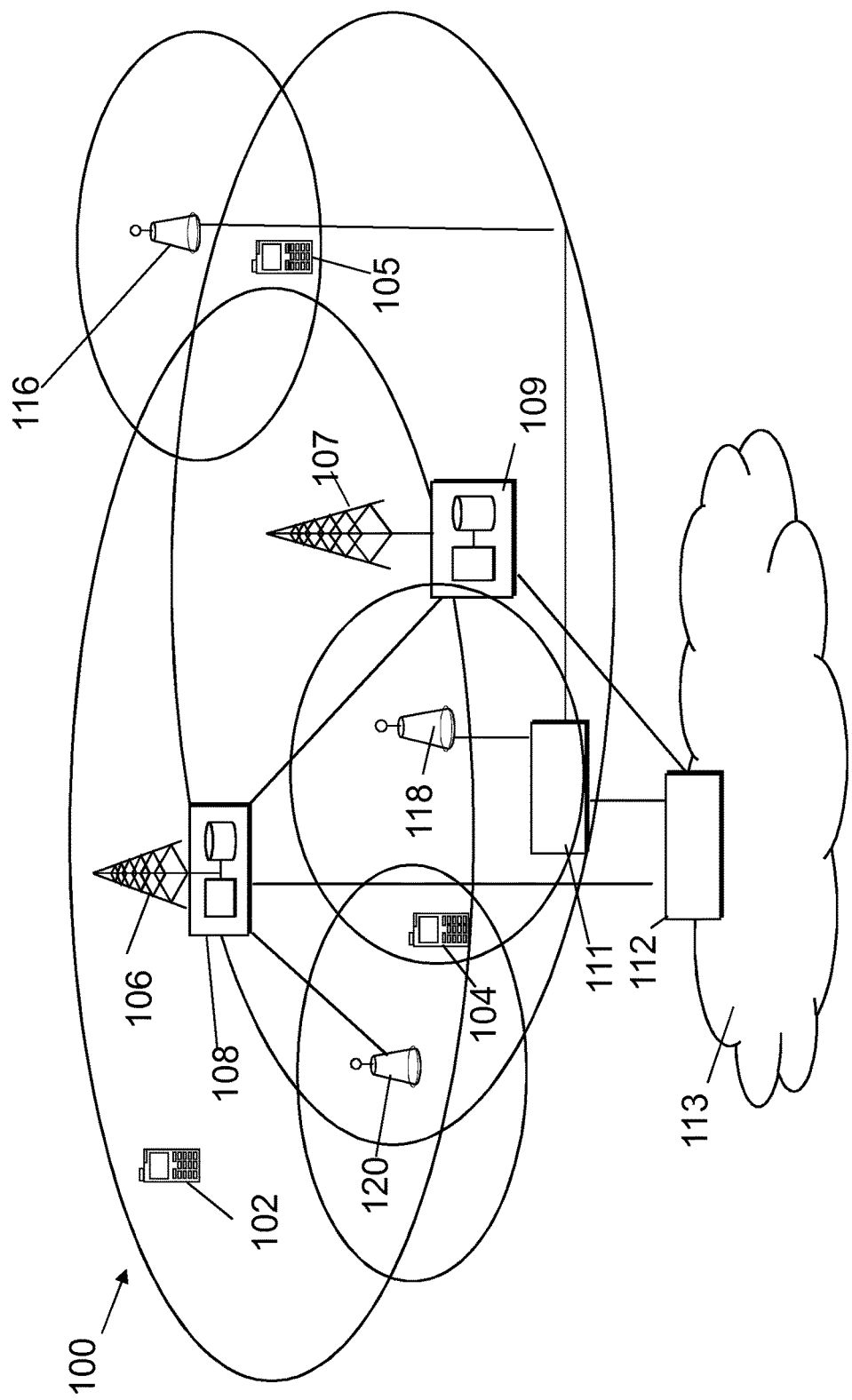
FIG. 1 shows a schematic diagram of an example communication system comprising a base station and a plurality of communication devices.

In a wireless communication system 100, such as that shown in FIG. 1, communication devices (e.g., user equipment (UE)) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a Radio Access Network (RAN) (e.g. wireless communication system 100) or in a core network (CN) (not shown) and may be implemented as one central apparatus or its functionality may be distributed over several apparatuses. The controller apparatus may be part of the base station and/or provided by a separate entity such as a radio network controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst base station 120 connects via the controller apparatus 108. In some embodiments, the smaller base stations may not be provided. Smaller base stations 116, 118 and 120 may be part of a second network, for example WLAN and may be WLAN Access Points (APs).

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements include Mobility Management Entity (MME), Serving Gateway (S-GW) and Packet Gateway (P-GW).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

An example 5G core network (CN) comprises functional entities. The CN is connected to a UE via the radio access network (RAN). An User Plane Function (UPF) whose role is called PDU Session Anchor (PSA) may be responsible for forwarding frames back and forth between the data network (DN) and the tunnels established over the 5G towards the UE(s) exchanging traffic with the DN.

The UPF is controlled by an Session Management Function (SMF) that receives policies from a Policy Control Function (PCF). The CN may also include an Access & Mobility Function (AMF).

Figure 2:
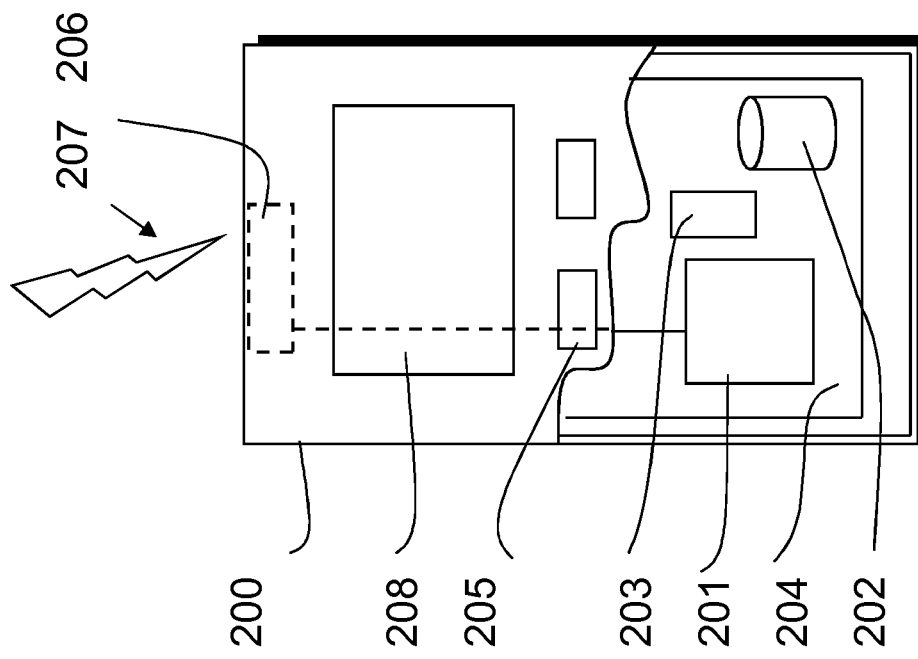
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

Figure 3:
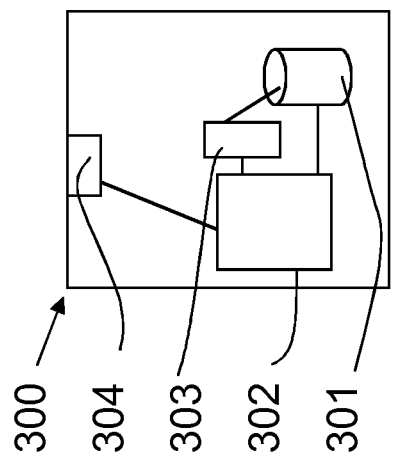
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

Conditional Handover (CHO) is currently being discussed as a possibility to improve mobility robustness for mobility enhancements in LTE and NR.

Figure 4:
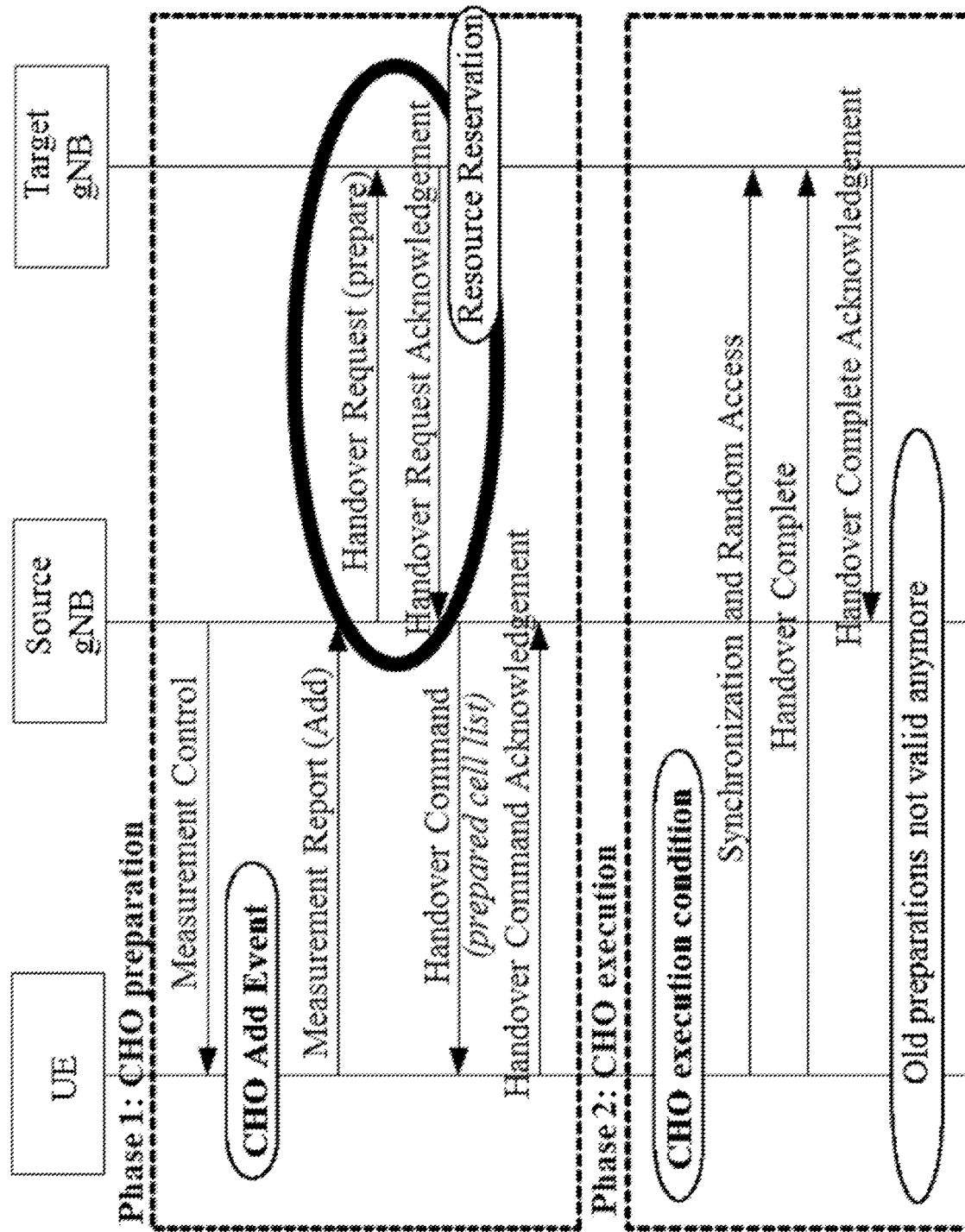
FIG. 4 shows a signalling flow between a UE, a source gNB and a target gNB for a conditional handover.

CHO is similar to legacy handover. A message sequence chart for CHO is shown in FIG. 4. The first steps (shown in "Phase 1: CHO preparation") are identical to legacy handover. A configured event triggers a UE to send a measurement report. Based on the measurement report, a source gNB typically prepares a target gNB or the handover (by sending a Handover Request to the target gNB and receiving a Handover Request Acknowledgement from the target gNB in response). The source gNB then sends a handover command to the UE and receives a Handover Command Acknowledgement from the UE.

For legacy handover (HO), the UE would immediately access the target cell to complete the handover. Instead, for CHO, the UE will only access the target once an additional CHO execution condition expires. The condition is configured by the source cell as a part of HO Command.

In CHO, the HO command may be sent early, when the UE is still safe in the source cell, without risking the access in the target cell and stability of its radio link.

The HO Command is generated by the target cell and included into the "Handover Request Acknowledgement", before the source cell forwards the HO Command to the UE via RRC signalling. Among others the HO Command includes random access parameters, which in particular may contain contention free random access (CFRA) resources such as dedicated preambles. These are used by the UE to execute CFRA. Without CFRA resources, the UE does contention based random access (CBRA) which may be subject to potential collisions.

A random access procedure may triggered by a number of events, including but not limited to initial access from RRC Idle mode, RRC connection re-establishment procedure, Handover, Downlink (DL) or Uplink (UL) data arrival during RRC Connected when the UL synchronization status is non-synchronized, UL data arriving during RRC Connected where there are no Physical Uplink Control Channel (PUCCH) resources for Scheduling Request (SR) available, SR failure, request by RRC upon synchronous reconfiguration, transition from RRC inactive to RRC_Connected, to establish time alignment of Secondary Cell addition in dual connectivity, request for Other System Information (SI) and beam failure recovery (BFR).

The random access procedure may take two distinct forms: Contention-Based Random Access (CBRA) and Contention-Free Random Access (CFRA).

Figure 5B:
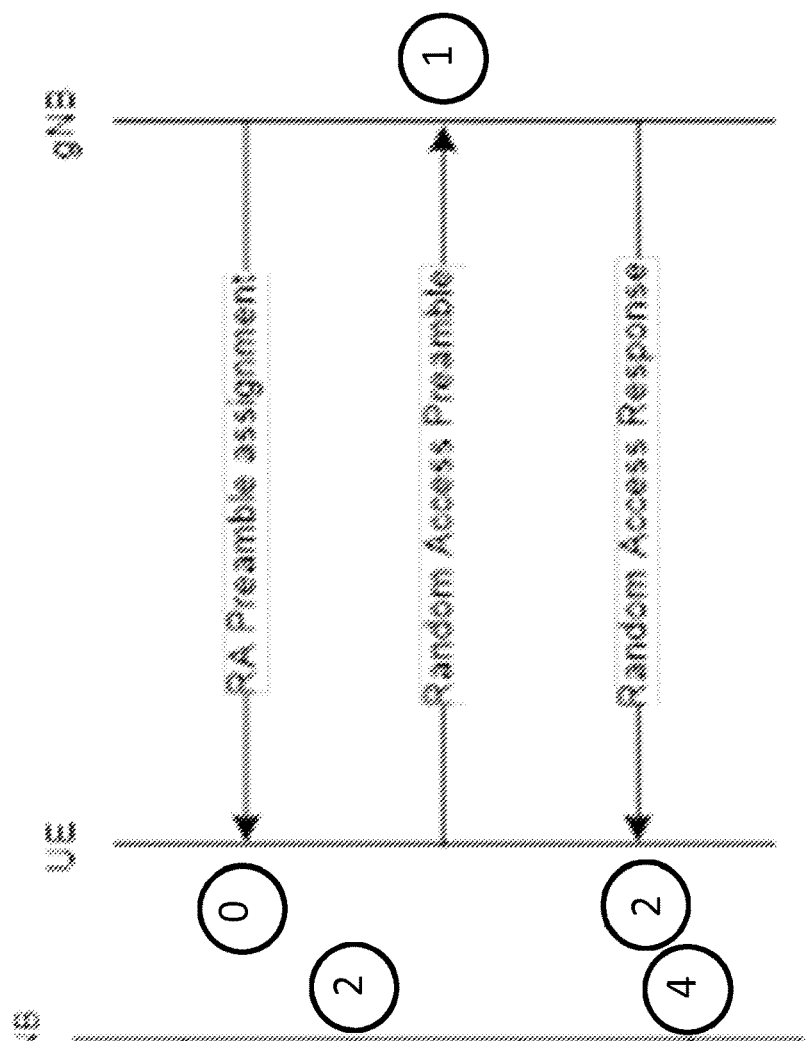
FIG. 5b shows a signalling flow for a contention-free random access procedure.
Figure 5A:
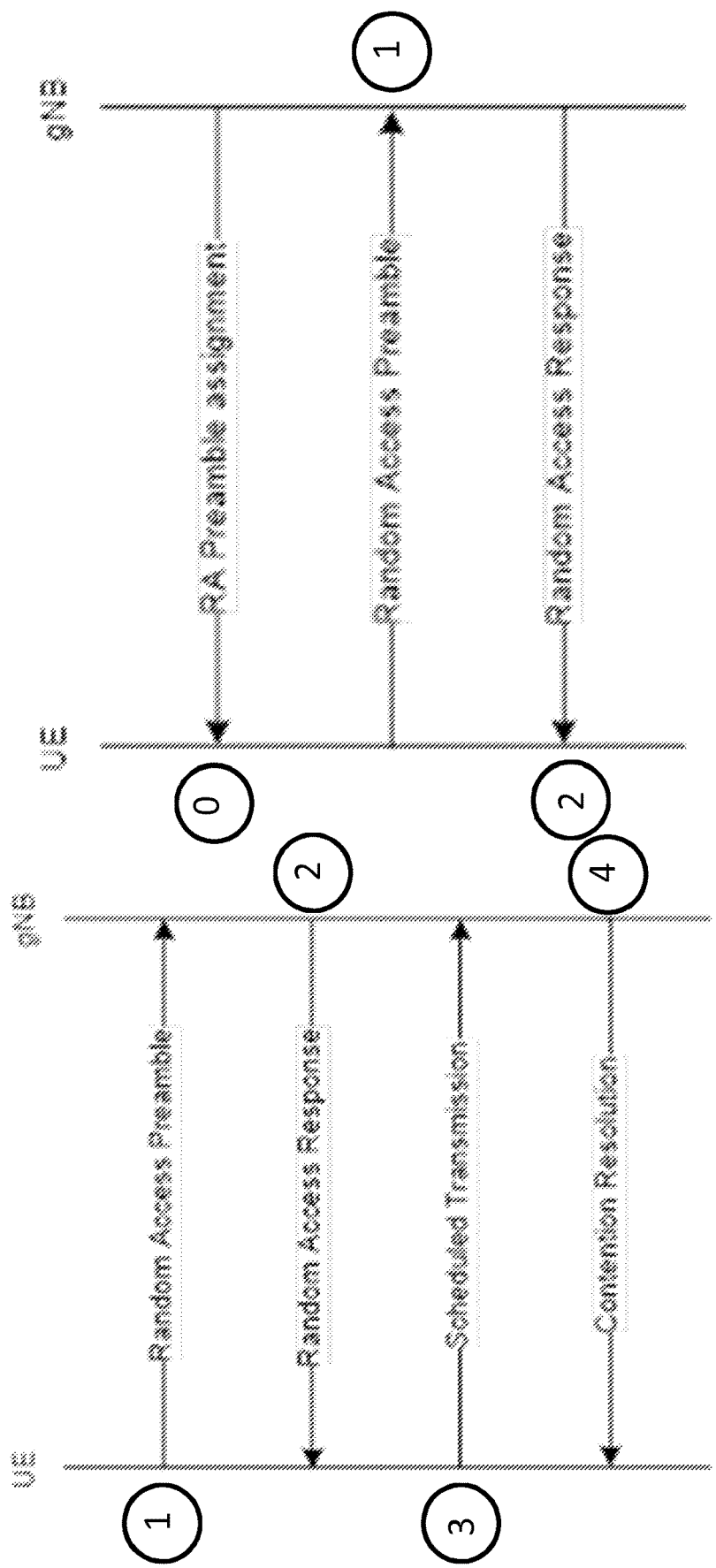
FIG. 5a shows a signalling flow for a contention-based random access procedure.

FIG. 5a shows a signalling diagram for CBRA. In step 1, the UE selects one RACH preamble out of a configured set and transmits the preamble in one of the pre-determined RACH occasions. If the Random Access Response (RAR) is not received, UE increases the preamble power and transmits the preamble again (this is called "power ramping", and it allows UE to estimate the needed UL transmit power for the initial message before sending the actual RRC message payload to network).

In step 2, the gNB sends a RAR generated by Medium Access Control (MAC) layer. The RAR provides timing advance, initial UL grant to send Message 3 and assignment of temporary Cell-Radio Network Temporary Identifier (C-RNTI).

In step 3, using the UL grant provided in RAR, the UE sends Message 3 to the gNB. The content for Message 3 depends on whether the UE performs initial access (Message 3 would be RRCSetupRequest), RRC resume (Message 3 would be RRCResumeRequest), RRC re-establishment (Message 3 would be RRCReestablishmentRequest), or handover (Message 3 would be RRCReconfigurationComplete) or beam failure recovery (Message 3 would consist of C-RNTI MAC CE).

In step 4, contention resolution is performed in Message 4 by echoing back the UE identity for the received message. This is interpreted by UEs that have lost the contention, i.e., due to possible collision in preamble transmission, as having to repeat the RACH procedure.

FIG. 5*b* shows a signalling diagram for CFRA

In step 0, the network configures the UE with dedicated RACH preamble(s). This is done e.g., with Handover Command or BFR configuration.

When performing the RACH access in Step 1, the UE transmits the dedicated RACH preamble in one of the pre-configured RACH occasion. Similarly as with CBRA, if the RAR is not received, UE performs power ramping to increase the preamble power according to network configuration. The RACH access procedure is completed when UE successfully receives the RAR in step 2 (along with the usual UL grant for transmitting the Message 3 containing the RRC payload towards the network).

RACH-less HO was designed as a part of LTE Rel-14. Its main goal was to decrease the interruption encountered by the UE during handover by skipping the first two steps of the Random Access procedure (transmission of RACH preamble and receiving RAR) and sending RRC Reconfiguration Complete directly after the reception of the handover. In order to make it possible, the questions of how to obtain the UL grant for uplink data transmission for example in a physical uplink shared channel (PUSCH), how to estimate the Timing Advance (TA) and how to set the initial UL transmit power for the target cell had to be addressed.

The LTE Rel-14 RACH-less HO solution addressed these as follows.

To obtain a UL grant (also referred to as an UL resource grant) for uplink data transmission in PUSCH, either UE receives a semi-persistent PUSCH grant as part of the HO command configuration, or, if it was not provided via RRC Connection Reconfiguration (in the HO command), in the source cell the UE directly obtains the UL grant by decoding the target cell's control channel, e.g., physical downlink control channel (PDCCH).

To estimate TA estimation, it was concluded that RACH-less HO may be applied only when source cell's TA can be reused (i.e. target cell's TA=source cell's TA) or when TA=0 can be used (e.g. small cells).

To set the initial UL transmit power, the UE does regular open loop power control (PC) towards the target cell, and afterwards can follow the closed loop PC commands received via PDCCH. Hence, the power ramping step is ignored and the initial UL transmit power may be not very accurate.

RACH-less HO is considered to be one of the candidate solutions in the NR Mobility enhancements Work Item which is designing Conditional Handover (CHO). Its feasibility in beam-based systems has been studied by 3GPP working groups RAN1 and RAN4. The liaison statement sent by RAN4 provided the following feedback:

" . . . it is preliminarily observed in RAN4 that if the source cell can configure multiple UL grant resources associated with different DL RS (SSB or CSI-RS) in target cell, handover successful rate can be increased. Note this also increase resource overhead in the target cell. However, the gain in handover successful rate over the resource overhead may need further study. RAN2 can decide if to support this . . . "

It may be possible to configure both procedures jointly, i.e., the UE may be provided with UL grant for PUSCH in the target cell and at the same time with a CHO execution condition for using this PUSCH grant and accessing the target cell without random access. This combined solution may require dedicated means to guarantee inherent characteristics of each individual solution do not negatively impact the gains from the other one. The basic problem to be solved may be the same as for regular RACH-less HO: how to determine UL grant for uplink data transmission, e.g., in PUSCH, how to determine TA and how to set initial UL transmit power.

In the scenario where both solutions, CHO and RACH-less HO, are used jointly to reap the benefits of each, UL grants may be configured in the (C)HO command for RACH-less HO based on the measurement reports (MRs) sent by the UE while still in the source cell. Thus, considering the relatively long time between the MR and the actual CHO execution, combined RACH-less CHO may require a procedure for updating the UL grants associated with Synchronization Signal Blocks (SSBs)/or Channel State Information-Reference Signal (CSI-RS) if the previously configured UL grants have either 1) become obsolete due to the deteriorating radio conditions or 2) because the target cell(s) do not want to keep the resource reservation for such a long time.

Target cells may not want to keep a resource reservation for a long time because preconfigured and periodic UL grant(s) may be costly from the target cell's resource allocation perspective. This may be especially severe in case CHO is used where the time between the handover preparation and execution can be in the order of seconds (up to 15-20 s in some cases). Thus, the target cell may want to either de-configure those UL grant(s) or release just a subset of these.

Figure 6:
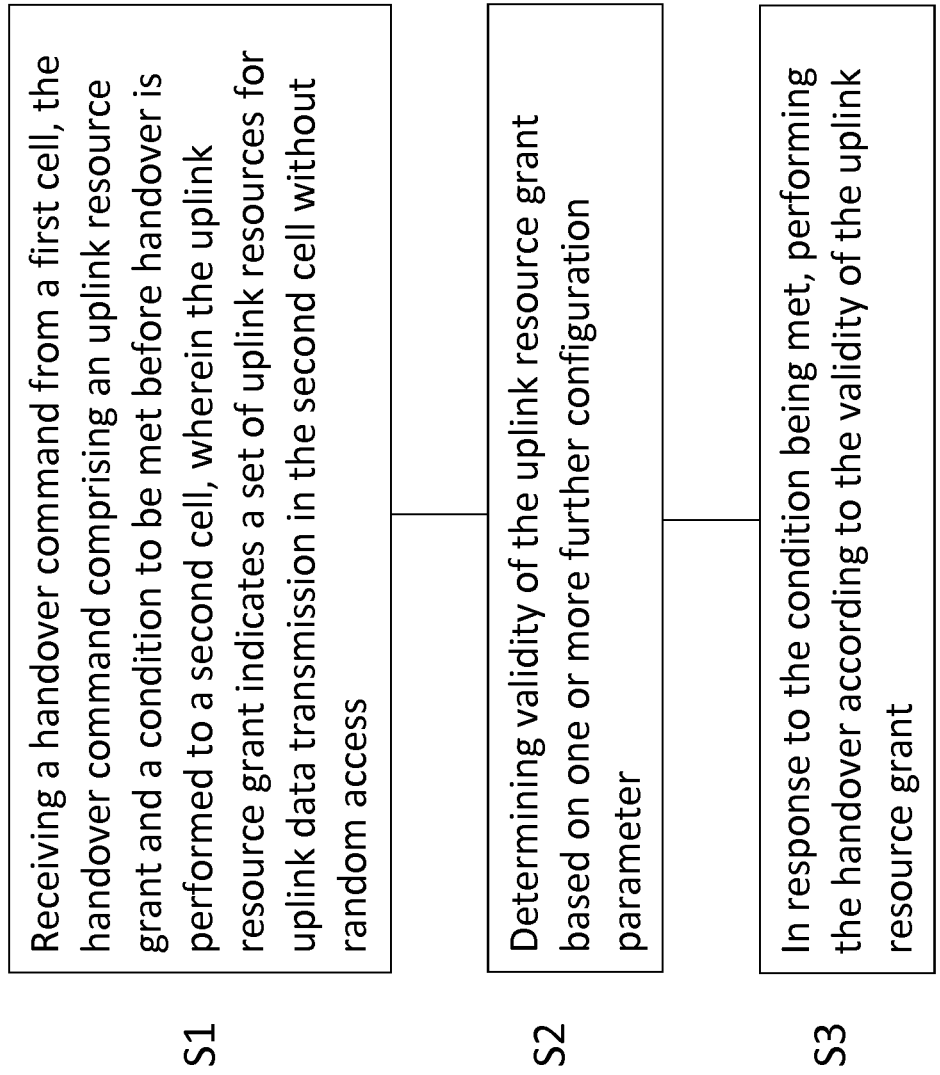
FIG. 6 shows a flowchart of a method according to an example embodiment.

FIG. 6 shows a flowchart of a method according to an example embodiment.

In a first step, S1, the method comprises receiving a handover command from a first cell, the handover command comprising an uplink resource grant and a condition to be met before handover is performed to a second cell, wherein the uplink resource grant indicates a set of uplink resources for uplink data transmission in the second cell without random access.

In a second step, S2, the method comprises determining validity of the uplink resource grant based on one or more further configuration parameter.

In a third step, S3, the method comprises, in response to the condition being met, performing the handover according to the validity of the uplink resource grant.

The method may be performed by a communication device, for example, one of communication devices 102, 104 and 105 in FIG. 1.

The first cell may be a source cell. The second cell may be a target cell of a handover procedure. The one or more further configuration parameter may be received in the handover command or an additional message.

The one or more further configuration parameter may comprise a threshold for at least one of signal strength and signal quality of a reference signal associated with the set of uplink resources. The reference signal may be, for example, SSB or CSI-RS. In the second step, S2, determining validity of the uplink resource grant may comprise determining that the at least one of signal strength and signal quality associated with a subset or all of the set of uplink resources is below the threshold; and, in response, providing an indication to the first cell that the at least one of signal strength and signal quality of the reference signal is below the threshold. The threshold may be controlled by the network. For example, the threshold may be configured to be the same as the threshold used for deriving cell quality. Alternatively, the threshold may be fixed in a technical specification. In some embodiments, the indication provided to the first cell may comprise a measurement report. Alternatively, the indication may comprise an indicator.

The indication may be received at a first network device serving a first cell and provided to a second network device serving a second cell. The second network device may provide an updated uplink resource grant for the handover to the first network device. The first network device may provide the updated uplink resource grant received from the second network device to the user equipment. Additionally or alternatively, the second network device may release the set of uplink resources allocated to the user equipment for CHO.

The method may comprise receiving an updated uplink resource grant from the first cell in response to the indication. In the third step S3, performing the handover according to the validity of the uplink resource grant may comprise performing the handover to the second cell based on the updated uplink resource grant when the condition is met.

In one example embodiment, prior to the CHO execution condition being met, a UE that is configured with SSB/CSI-RS specific UL grants for accessing a target cell may inform the gNB of a source cell when the UE discovers the signal strength/quality on all or on a subset of these SSBs/CSI-RSs is below an acceptable level (which is defined by the threshold). This, in turn, may trigger the UL grant update procedure at the gNB. The UL grant procedure may increase the chance of successful access when CHO execution condition is eventually met.

The one or more further configuration parameter may comprise one or more of a timer and an indication of a time resource number. As an example, the time resource number may be time resource index such as a specific radio frame/subframe/slot number.

In the second step S2, determining validity of the uplink resource grant may comprise determining that the uplink resource grant is invalid, in response to at least one of expiry of the timer and the indicated time resource number being reached.

In some embodiments, performing the handover according to the validity of the uplink resource grant in the third step S3 may comprise performing a random access based handover to the second cell when the condition is met, in response to determining that uplink resource grant is invalid In one example, the validity of RACH-less configurations (i.e. the UL resource grant), which may be configured by multiple candidate target cells, is constrained and controlled by a timer for time duration T. If the timer expires while the CHO execution condition is not yet fulfilled, the UE falls back to RA-based approach and uses CBRA/CFRA when the CHO execution condition eventually triggers. Note that this trigger does not invalidate the CHO command, just the combination of RACH-less HO with CHO (i.e. the stored CHO becomes regular CHO using RACH for HO execution).

In an alternative example embodiment, the RACH-less configurations are determined to be invalid (and release of the UL resource grants is performed by the UE) at a specific radio resource, e.g., specific frame/subframe/slot numbers that are determined by the target cell via (C)HO command. Herein, the UE does not have to start a timer but rather monitors the indicated radio frame/subframe/slot numbers to release all or some of the pre-configured UL grants for RACH-less handover.

As an alternative to determining that the UL resource grant is invalid, one option is to reduce the number of valid UL resource grants upon timer T expiry or at the specific radio frame/subframe/slot number.

The method may comprise discarding at least a subset of the set of uplink resources, in response to at least one of expiry of the timer and the indicated time resource number being reached. Discarding an UL resource of the set of UL resources comprises discarding the UL resource grant for that resource.

In the third step, S3, performing the handover according to the validity of the uplink resource grant may comprises performing the handover by using a subset of the set of uplink resources other than the discarded subset for uplink data transmission in the second cell.

For example, a UE may be configured with N UL resource grants, for different beams. After the time period elapses, the UE discards a predetermined amount (X % or an absolute number) of the UL resource grants.

The discarded subset of the set of UL resources may be determined by the UE (e.g. starting from those UL resources which correspond to cells/beams currently having the lowest signal quality/strength as measured by the UE). On expiry of the timer or at the indicated time resource number, the method may comprise determining which subset of the uplink resources to discard based on whether at least one of signal strength and signal quality of a reference signal associated with the set of uplink resources is below a threshold.

The rules for selecting the subset of the set of uplink resources to be discarded may be predefined or provided by the network. For example, the UE may determine to discard the subset of the uplink resources that are associated with the weakest received signal strength/quality measurements on SSB/CSI-RS. The threshold may be provided by the second cell in a HO command or in another message which is sent to the UE by the first cell.

Alternatively, the discarded subset of the set of UL resources may be pre-configured by the target cell in the HO command during the handover preparation phase. The method may comprise receiving an indication from the first cell of the at least a subset of the set of uplink resources to discard on expiry of the timer or at the indicated time resource number. The indication may be received in the HO command or an additional message.

In some embodiments, the UE may provide an indication to the first cell that the subset of the set of uplink resources has been discarded. That is, the discarding of the at least a subset of the set of UL resources may be communicated to the network (e.g., via measurement report or other MAC/RRC signalling). The indication may be received at a first network device serving a first cell and provided by the first network device to a second network device serving a second cell. The second network device may release the subset of the set of uplink resources that have been allocated to the user equipment for CHO.

If an UL resource of the set of UL resources is discarded due to timer expiry, the timer may be restarted if UL resource grants are still stored by the UE (to allow gradual release of the UL resource grants in a controlled manner).

Figure 7:
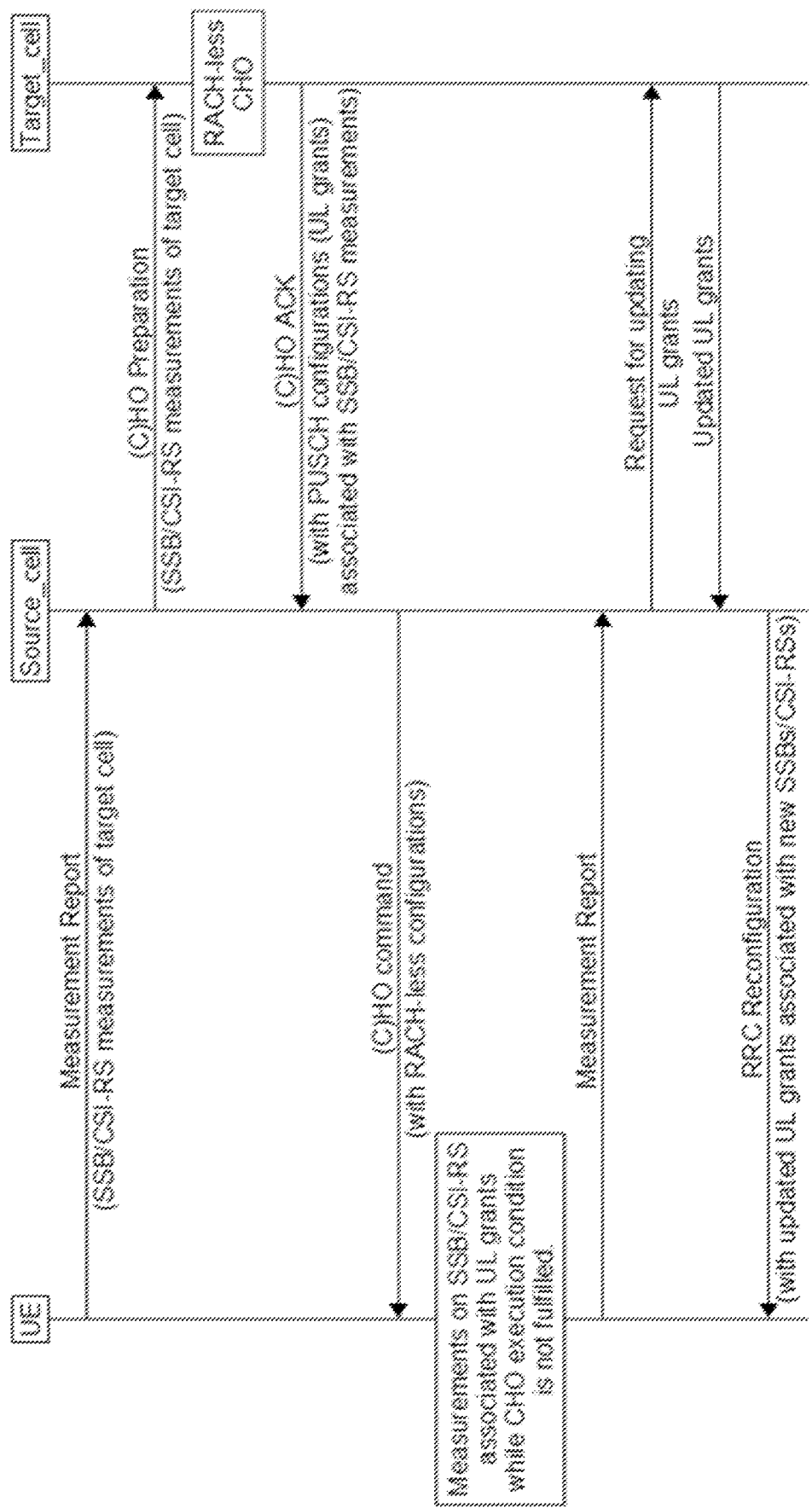
FIG. 7 shows a signalling flow for an example embodiment.

FIG. 7 depicts a message flow for a possible implementation of UL grant update procedure. In this example, based on the measurement reports provided by the UE, source and target cell(s) decide to prepare a Conditional Handover with RACH-less access. As a result, UL resource grants (indicating a set of uplink resources for uplink data transmission in the second cell without random access) for multiple beams are provided to the UE for sending Message 3 (RRC Reconfiguration Complete) to the selected target cell (once CHO execution condition triggers).

When evaluating the CHO execution condition, the UE monitors the signal strength and/or quality of the SSB(s)/CSI-RS(s) that are associated with the received UL resource grant(s). If the UE discovers that their signal strength and/or quality falls below a threshold, the UE sends a measurement report to inform the network of the need for UL resource grant update. This, in turn, triggers action on the network side, provided that the source and target cells can negotiate and provide updated UL resource grants in a new RRC reconfiguration message (as shown in the final three steps in FIG. 7).

For sending the measurement report, the target cell may configure the UE with specific measurement events evaluating beam measurements and comparing them against a threshold as stated above.

In another embodiment, the UE may send the measurement report when it detects a better received signal strength/quality from an SSB/CSI-RS other than the SSB/CSI-RS that is associated with the UL resource grant irrespective of whether the configured SSB/CSI-RS associated with UL resource grants is below/or higher than an acceptable level. That is, the method may comprise detecting signal strength or signal quality for a reference signal associated with an uplink resource other than those indicated in the uplink resource grant and providing a measurement report to the first cell, in response to the detected signal strength or signal quality exceeding a reference level. The reference level may be defined based on a signal strength or signal quality for a reference signal that is associated with the uplink resource grant.

Figure 8:
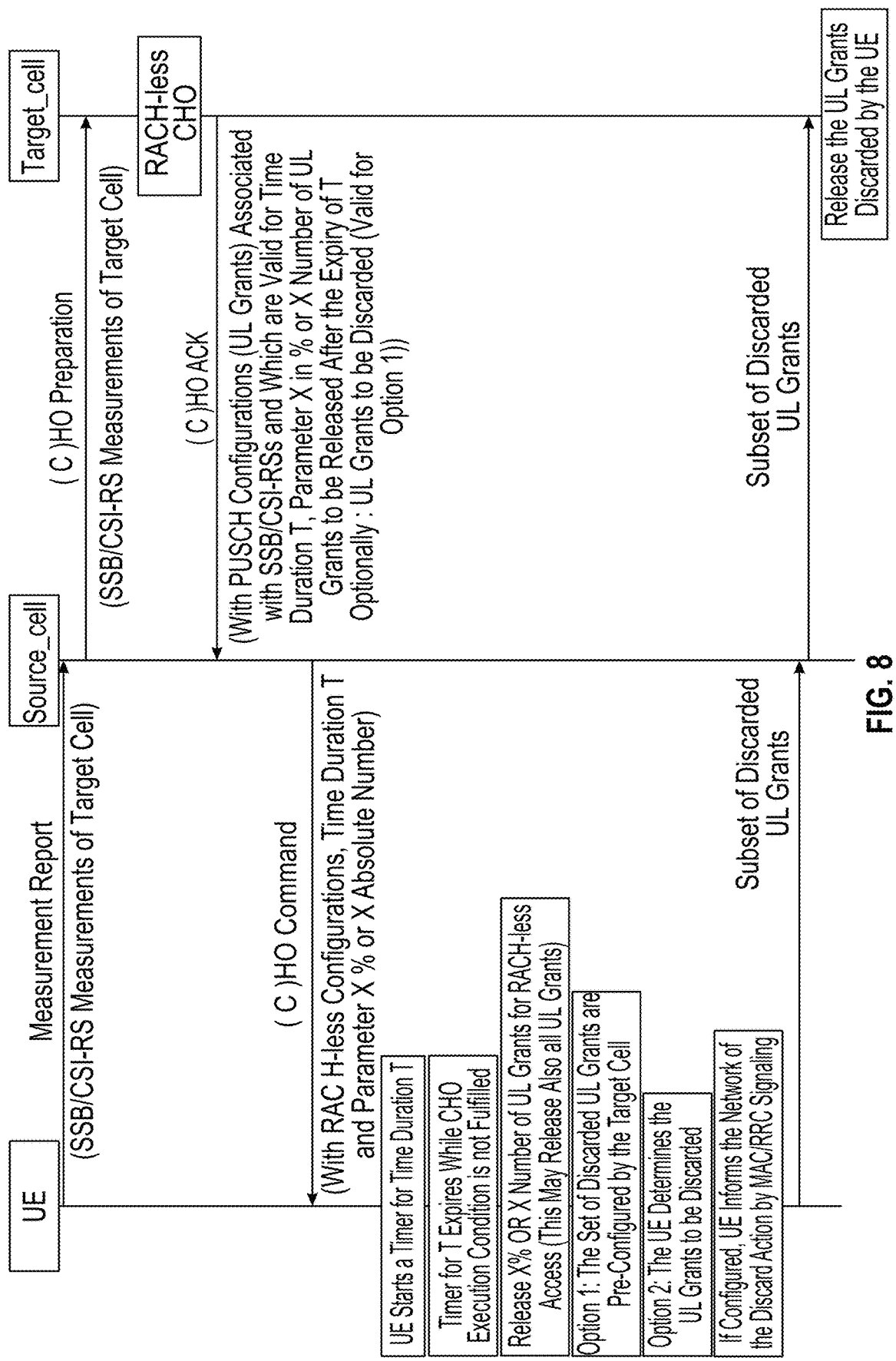
FIG. 8 shows a signalling flow for an example embodiment.

FIG. 8 illustrates another example embodiment of the method of FIG. 6. In this example, the target cell(s) reserve UL grants of the RACH-less resources for a limited time duration T. The time duration T is provided to the UE in (C)HO command (RRC Reconfiguration for the purpose of handover).

In this example, the timer for time duration T expires prior to CHO execution. The UE discards X % or x number of set of UL resources indicated in the provided UL resource grants for accessing the target cell(s) in RACH-less manner. If the network does not want to allow RACH-less access at all upon the expiry of the timer, it may simply configure X to 100%. This will trigger a fall-back from RACH-less to RA-based access (CBRA or CFRA if CFRA resources were configured and the network still wants to keep such dedicated preparation).

The list of UL resource grants (and corresponding UL resources) to be discarded may have been provided from the network when the UL resource grants were configured (i.e. via (C)HO command).

Alternatively, the UE may determine the resources to be discarded from those indicated in the UL resource grants.

The timer may be immediately restarted (e.g. to allow UE to continue gradually discarding remaining UL resource grants) once the determined UL resource grants are discarded. The UE may report the action to the network (via e.g. RRC or MAC CE signalling). When the source cell becomes aware of the UL resource grant discard, it indicates the UL resource grant discard to the target cell so the target cell can invalidate the existing UL resource grants (or the target cell may already have indicated to the source cell the set of UL resource grants to be discarded after time duration T when configuring the CHO command).

An apparatus may comprise means for receiving a handover command from a first cell, the handover command comprising an uplink resource grant and a condition to be met before handover is performed to a second cell, wherein the uplink resource grant indicates a set of uplink resources for uplink data transmission in the second cell without random access, determining validity of the uplink resource grant based on one or more further configuration parameter and in response to the condition being met, performing the handover according to the validity of the uplink resource grant.

A first network device serving a first cell may comprise means for receiving an indication from a communication device in the first cell, the indication indicating that at least one of signal strength and signal quality of a reference signal associated with at least a subset of a set of uplink resources allocated for conditional handover to a second cell without random access is below a threshold, or at least a subset of the set of uplink resources is discarded and providing the indication to a second network device serving the second cell.

A second network device serving a second cell, said second network device comprising means for receiving an indication from a first network device serving a first cell, the indication indicating that at least one of signal strength and signal quality associated with a reference signal of at least a subset of a set of uplink resources allocated to a communication device for conditional handover to the second cell without random access is below a threshold, or at least a subset of the set of uplink resources is discarded by the communication device and performing at least one of providing an updated uplink resource grant for the handover to the first network device and releasing the subset of the set of uplink resources allocated to the communication device.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to CHO in LTE and NR, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims.

Indeed, there is a further embodiment comprising a combination of one or more embodiments with any of the other embodiments previously discussed.

The invention claimed is:

1. An apparatus, comprising at least one processor and at least one memory including a computer program code, the at least one memory and computer program code configured to, with the at least one processor, cause the apparatus at least to:
receive a handover command from a first cell, the handover command comprising an uplink resource grant of a number of uplink resources grants and a condition to be met before handover is performed to a second cell, wherein the uplink resource grant indicates a set of uplink resources for uplink data transmission in the second cell without random access, wherein the first cell is a source cell, and wherein the second cell is a target cell of a handover procedure;
determine validity of the uplink resource grant based on further configuration parameters, the further configuration parameters comprising a timer, an indication of a time resource number, and a threshold for signal strength and signal quality of a reference signal associated with the set of uplink resources,
wherein the reference signal is a Channel State Information-Reference Signal (CSI-RS),
wherein determining validity of the uplink resource grant further includes in a case where it is determined that the uplink resource grant is invalid in response to expiry of the timer and the indicated time resource number being reached, and in response to the condition being met, perform a random access based handover to the second cell based on the invalidity of the uplink resource grant;
reduce the number of uplink resource grants that are valid at a specific radio frame, subframe, or slot number;
receive the further configuration parameter in the handover command or an additional message from the first cell;
detect signal strength and signal quality for a reference signal associated with an uplink resource other than those indicated in the uplink resource grant;
provide a measurement report to the first cell, in response to the detected signal strength and signal quality exceeding a reference level, wherein the reference level is defined based on a signal strength and signal quality for a reference signal associated with the uplink resource grant;

provide an indication to the first cell if the signal strength and signal quality of the reference signal is below the threshold, or discard at least a subset of the set of uplink resources in response to at least one of expiry of the timer or the indicated time resource number being reached;

determine which subset of the set of uplink resources to discard based on whether the reference signal associated with the uplink resource is below the threshold;

provide an indication to the first cell that the subset of the set of uplink resources has been discarded;

receive an updated uplink resource grant from the first cell in response to the indication that the signal strength and signal quality of the reference signal is below the threshold; and in response to the condition being met, perform the handover based on the validity of the updated uplink resource grant.

\* \* \* \* \*